US012488180B2

United States Patent
Chalabi et al.

(10) Patent No.: US 12,488,180 B2
(45) Date of Patent: Dec. 2, 2025

(54) SYSTEMS AND METHODS FOR GENERATING DIALOG TREES

(71) Applicant: Microsoft Technology Licensing, LLC, Redmond, WA (US)

(72) Inventors: Achraf Abdelmoneim Tawfik Mahmoud Chalabi, Cairo (EG); Michael Zaki Adel Zaki Farag, Alexandria (EG); Sameh Hany Ahmed Abdulrahim, Alexandria (EG); Mohamed Hussein Mohamed Hussein, Zagazig (EG); Ahmed Salaheldin Mohamed Ahmed Mohamed, Giza (EG); Eslam Kamal Abdelreheem, Sammamish, WA (US); Omar Mohamed Hamed Abouelkhir, Redmond, WA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 566 days.

(21) Appl. No.: 17/334,543

(22) Filed: May 28, 2021

(65) Prior Publication Data
US 2022/0318497 A1    Oct. 6, 2022

Related U.S. Application Data

(60) Provisional application No. 63/168,117, filed on Mar. 30, 2021.

(51) Int. Cl.
*G06F 40/205* (2020.01)

(52) U.S. Cl.
CPC ................. *G06F 40/205* (2020.01)

(58) Field of Classification Search
CPC ....... G06F 40/205; G06F 40/106; G06N 5/01; G06N 5/041; G06N 20/00
See application file for complete search history.

(56) References Cited

U.S. PATENT DOCUMENTS

| 7,266,222 | B2 | 9/2007 | Harrington et al. |
| 9,811,515 | B2 | 11/2017 | Allen et al. |
| 10,049,270 | B1* | 8/2018 | Agarwalla ........... G06V 30/414 |

(Continued)

OTHER PUBLICATIONS

Chang et al. (2018. RecipeScape: An Interactive Tool for Analyzing Cooking Instructions at Scale. In Proceedings of the 2018 CHI Conference on Human Factors in Computing Systems (CHI '18). Association for Computing Machinery, New York, NY, USA, Paper 451, 1-12. (Year: 2018).*

(Continued)

*Primary Examiner* — Pierre Louis Desir
*Assistant Examiner* — Keisha Y. Castillo-Torres
(74) *Attorney, Agent, or Firm* — Alleman Hall & Tuttle LLP

(57) ABSTRACT

A dialog tree generation system is provided, including a processor, and a memory storing instructions that, when executed by the processor, cause the system to receive documents, parse the documents into raw blocks, extract visual design elements from the raw blocks, generate a content structure from the extracted visual design elements, generate at least a dialog decision tree based on the extracted content structure, the dialog decision tree comprising a plurality of nodes organized into a hierarchy, and output the dialog decision tree.

20 Claims, 14 Drawing Sheets

(56) References Cited

U.S. PATENT DOCUMENTS

| | | | | |
|---|---|---|---|---|
| 2005/0097070 | A1 | 5/2005 | Enis et al. | |
| 2005/0278340 | A1 | 12/2005 | Rehberg et al. | |
| 2006/0242180 | A1* | 10/2006 | Graf | G06F 16/38 |
| 2007/0027893 | A1 | 2/2007 | Gundy et al. | |
| 2007/0166674 | A1 | 7/2007 | Kochunni et al. | |
| 2007/0250497 | A1* | 10/2007 | Mansfield | G06F 16/36 |
| | | | | 707/999.005 |
| 2008/0152238 | A1* | 6/2008 | Sarkar | G06V 30/40 |
| | | | | 382/228 |
| 2009/0327338 | A1* | 12/2009 | Zhao | G06F 16/9558 |
| 2011/0252315 | A1* | 10/2011 | Misawa | G06V 30/413 |
| | | | | 715/256 |
| 2019/0028588 | A1* | 1/2019 | Shinseki | H04M 3/5231 |
| 2019/0132264 | A1* | 5/2019 | Jafar Ali | G06F 40/295 |
| 2020/0334697 | A1* | 10/2020 | BaderEddin | G06F 40/20 |
| 2022/0300716 | A1* | 9/2022 | Sabharwal | G06F 16/24578 |

OTHER PUBLICATIONS

"Building a Document-Based Chatbot", Retrieved from: https://www.capgemini.com/in-en/2018/03/building-a-document-based-chatbot/, Mar. 5, 2018, 8 Pages.

Baharudin, et al., "A Review of Machine Learning Algorithms for Text-Documents Classification", In Journal of Advances in Information Technology, vol. 1, Issue 1, Feb. 2010, pp. 4-20.

Berry, Dina, "Bring the Power of the Public Cloud into Your Data Center", In White paper of Intel, Nov. 2, 2018, 11 Pages.

Luthier, et al., "Chat or Learn: A Data-Driven Robust Question-Answering System", In Proceedings of the 12th Conference on Language Resources and Evaluation, May 11, 2020, pp. 5474-5480.

Rajput, et al., "Best Practices of a QnA Maker Knowledge Base", Retrieved from: https://docs.microsoft.com/en-us/azure/cognitive-services/qnamaker/concepts/best-practices?tabs=v1, Sep. 11, 2020, 9 Pages.

Rajput, et al., "Troubleshooting for QnA Maker", Retrieved from: https://docs.microsoft.com/en-us/azure/cognitive-services/QnAMaker/troubleshooting?tabs=v1, Sep. 11, 2020, 4 Pages.

Thomas, Christian, "Why do my Headphones Sound Bad?", Retrieved from: https://www.soundguys.com/why-do-my-headphones-suck-troubleshooting-bad-audio-12375/, Mar. 16, 2021, 11 Pages.

"International Search Report and Written Opinion Issued in PCT Application No. PCT/US22/019215", Mailed Date: May 30, 2022, 10 Pages.

* cited by examiner

SYSTEMS AND METHODS FOR GENERATING DIALOG TREES

CROSS REFERENCE TO RELATED APPLICATIONS

This application claims priority to U.S. Provisional Patent Application No. 63/168,117, filed Mar. 30, 2021, the entirety of which is hereby incorporated herein by reference for all purposes.

BACKGROUND

Interactive question answering systems are widely used to provide customer support for products and services. Dialog systems are interactive question answering systems that access information from structured databases to answer questions from customers. Customers may interact with virtual agents or bots when interfacing with these dialog systems, in which a decision tree is traversed as the customer is asked a series of focused questions toward a final answer to the customer's question. Conventionally, human operators are employed to develop such dialog systems manually, which requires significant time, cost, and effort.

SUMMARY

In view of the above, a dialog tree generation system is provided, including a processor, and a memory storing instructions that, when executed by the processor, cause the system to receive documents, parse the documents into raw blocks, extract visual design elements from the raw blocks, generate a content structure from the extracted visual design elements, generate at least a dialog decision tree based on the extracted content structure, the dialog decision tree comprising a plurality of nodes organized into a hierarchy, and output the dialog decision tree.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

Figure 1A:
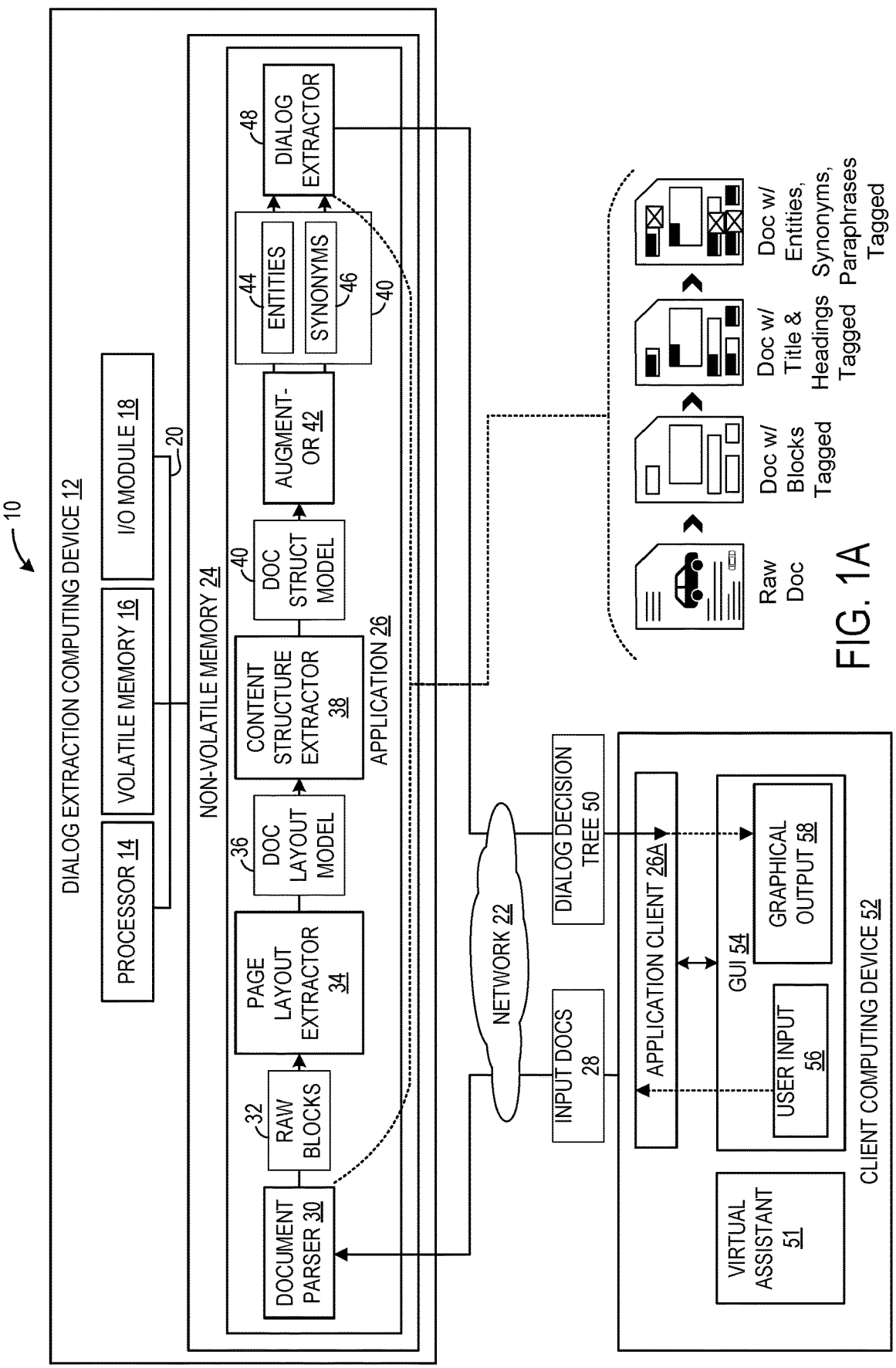
FIG. 1A is a general schematic diagram illustrating a dialog tree generation system according to an example embodiment of the subject disclosure.

In view of the above issues, automated systems and methods are provided to generate highly precise dialog systems that require minimal editing by human operators. Referring to FIG. 1A, a dialog tree generation system 10 is provided for use in extracting dialog information from documents. The dialog tree generation system 10 comprises a dialog extraction computing device 12 including a processor 14, volatile memory 16, an input/output module 18, and non-volatile memory 24 storing an application 26 including a document parser 30, a page layout extractor 34, a content structure extractor 38, an augmentor 42, and a dialog extractor 48.

A bus 20 can operatively couple the processor 14, the input/output module 18, and the volatile memory 16 to the non-volatile memory 24. Although the document parser 30, the page layout extractor 34, a content structure extractor 38, the augmentor 42, and the dialog extractor 48 are depicted as hosted (i.e., executed) at one computing device 12, it will be appreciated that the document parser 30, the page layout extractor 34, a content structure extractor 38, the augmentor 42, and the dialog extractor 48 can alternatively be hosted across a plurality of computing devices to which the computing device 12 is communicatively coupled via a network 22.

As one example of one such other computing device, a client computing device 52 can be provided, which is operatively coupled to the computing device 12. In some examples, the network 22 can take the form of a local area network (LAN), wide area network (WAN), wired network, wireless network, personal area network, or a combination thereof, and can include the Internet.

The computing device 12 comprises a processor 14 and a non-volatile memory 24 configured to store document parser 30, the page layout extractor 34, a content structure extractor 38, the augmentor 42, and the dialog extractor 48 in non-volatile memory 16. Non-volatile memory 24 is memory that retains instructions stored data even in the absence of externally applied power, such as FLASH memory, a hard disk, read only memory (ROM), electrically erasable programmable memory (EEPROM), etc. The instructions include one or more programs, including document parser 30, the page layout extractor 34, a content structure extractor 38, the augmentor 42, and the dialog extractor 48, and data used by such programs sufficient to perform the operations described herein. In response to execution by the processor 14, the instructions cause the processor 14 to execute document parser 30, the page layout extractor 34, a content structure extractor 38, the augmentor 42, and the dialog extractor 48.

The processor 14 is a microprocessor that includes one or more of a central processing unit (CPU), a graphical processing unit (GPU), an application specific integrated circuit (ASIC), a system on chip (SOC), a field-programmable gate array (FPGA), a logic circuit, or other suitable type of microprocessor configured to perform the functions recited herein. The system 10 further includes volatile memory 16 such as random access memory (RAM), static random access memory (SRAM), dynamic random access memory (DRAM), etc., which temporarily stores data only for so long as power is applied during execution of programs.

In one example, the client computing device 52 can execute an application client 26A to send input documents 28 to the computing device 12 as user input 56, and subsequently receive a dialog decision tree 50 from the computing device 12 as output. The dialog decision tree 50 can be associated with a virtual assistant 51 which is a program that is installed on the computing device 12. The virtual assistant 51 can also be referred to as a virtual agent, a chatter bot, a chatbot, a digital personal assistant, or an automated online assistant, for example. The computing device 12 executes the virtual assistant 51. The dialog decision tree 50 is executed by the virtual assistant 51 to thereby present an interactive chat dialog to a user that proceeds according to the dialog decision tree 50. The input documents can include PDF files, HTML files, PowerPoint files, Word documents, and OCR (optical character recognition) documents, for example. The application client 26A can be coupled to a graphical user interface 54 of the client computing device 52 to display graphical output 58 based on the dialog decision tree 50 outputted from the dialog extractor 48.

In this example, the document parser 30 receives input documents 28 as input, parses the input documents into raw blocks 32, and outputs the raw blocks 32, which can include raw text blocks, raw image blocks, and/or raw shape blocks. A raw text block is a body of text that is grouped together on a page of the input documents 28, a raw image block is an area on a page of the input documents 28 where a raw image is located, and a raw shape block is an area on a page of the input documents 28 where a raw shape is located. These raw blocks can be shaped like a square or a rectangle. The page layout extractor 34 receives the raw blocks 32 as input, processes the raw blocks 32 to extract visual design elements, and outputs a document layout model 36 comprising the visual design elements. The content structure extractor 38 receives the document layout model 36 as input, processes the document layout model 36 by analyzing the visual design elements in the document layout model 36, generates a document structure model 40 comprising a content structure from the extracted visual design elements, and outputs the document structure model 40. The augmentor 42 receives the document structure model 40 as input, annotates the document structure model 40, and outputs the document structure model 40 annotated with entities 44 and synonyms 46. The dialog extractor 48 receives the document structure model 40 annotated with entities 44 and synonyms 46 as input, processes the document structure model 40 annotated with entities 44 and synonyms 46, generates a dialog decision tree 50 based on the extracted content structure, and outputs the dialog decision tree 50 to the application client 26A to a location accessible by a virtual assistant 51. As described below, the dialog decision tree may include a plurality of nodes organized into a hierarchy.

Figure 1B:
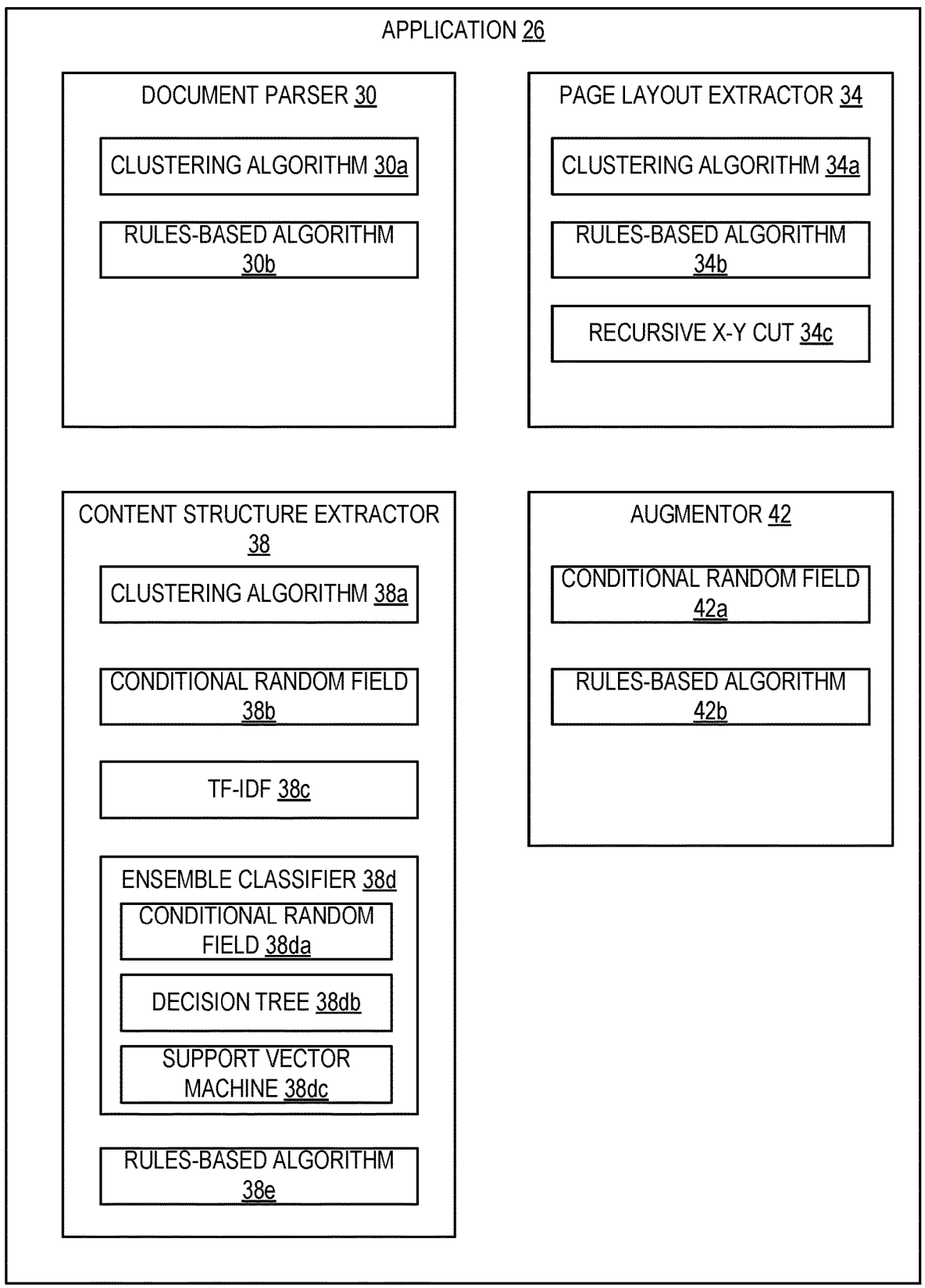
FIG. 1B is a general schematic diagram illustrating the tools that can be used by the document parser, page layout extractor, content structure extractor, and augmentor of the dialog tree generation system of FIG. 1A.

Referring to FIG. 1B, the processing tools that the document parser 30, the page layout extractor 34, the content structure extractor 38, and the augmentor 42 can use are depicted.

The document parser 30 can use a clustering algorithm 30a, and/or a rules-based algorithm 30b to cluster recognized text lines into text blocks, recognized vectors into raw shape blocks, and recognize raw images.

The page layout extractor 34 can use a clustering algorithm 34a, a rules-based algorithm 34b, and/or recursive x-y cut 34c to extract page layout elements. For example, the page layout extractor 34 can use recursive x-y cut 34c to extract and bound columns. Recursive x-y cut 34c can also segment a page into separate zones projecting filled pixels on the x-y axis of the page in a recursive way and splitting a given zone into multiple ones based on the energy distribution on a histogram. The page layout extractor 34 can use a clustering algorithm 34a to extract tables, clustering lines into separate bins (i.e., clusters of lines) to identify the number of different tables in a page and process the bins to identify the boundaries of each of the tables, or by segmenting table columns/rows based on alignment for borderless tables.

The content structure extractor 38 can use a clustering algorithm 38a, conditional random field (CRF) 38b, TF-IDF (term frequency—inverse document frequency) 38c, an ensemble classifier 38d, and/or a rules-based algorithm 38e to determine a document structure model 40. As a clustering algorithm 38a, agglomerative clustering can be used to identify the headings and their hierarchy. The clustering algorithm 38a can classify generated clusters as headings or content based on average member length and noise ratio, for example. Raw text blocks can be clustered and arranged in a hierarchy based on visual design elements which can comprise style and geometry properties, including font and typographical properties such as the typeface, letterforms, font size, font family, style, color, orientation, length, contrast, position, spacing, dimension, and others. Other visual design elements can be used to cluster and arrange the document into a hierarchy of visual design elements: paragraph alignment, line lengths, column widths, and graphic shapes. For example, decisive contrast between disparate visual design elements can be used to identify hierarchical relationships within the document. In some embodiments, an ensemble classifier 38d including a conditional random field 38da, decision tree 38db, and support vector machine 38dc can also be used by the content structure extractor 38 to extract headings.

The content structure extractor 38 can also use TF-IDF 38c to extract headings. For example, TF-IDF 38c on the boldness style can be used to detect inline headings. The content structure extractor 38 can also use a conditional random field 38b to extract titles.

The augmentor 42 can use a conditional random field 42a and/or a rules-based algorithm 42b to augment each node of the headings tree with metadata including entities and synonyms. Entities can be one of 3 classes: named entities, generic entities (key phrases), and action entities.

Figure 2A:
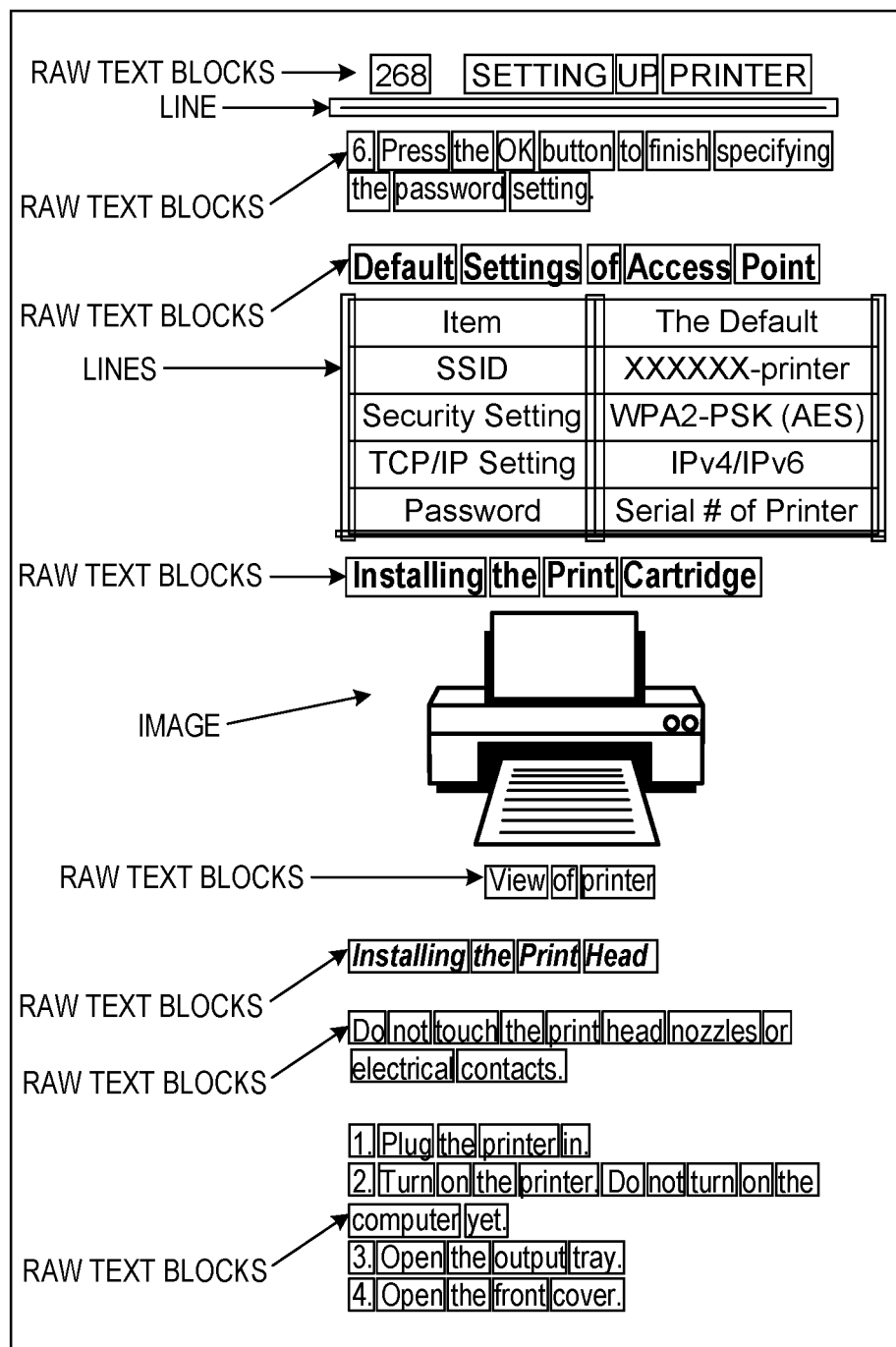
FIG. 2A is an illustration of an exemplary document parsing output of the document parser of the dialog tree generation system of FIGS. 1A and 1B.

Referring to FIGS. 2A-E, an example use case illustrating aspects of the present disclosure will now be presented. Referring to FIG. 2A an example of raw blocks 32 outputted by the document parser 30 is depicted. In this example, pages of a printer manual are inputted into the document parser 30, which processes the pages to extract raw text blocks, raw shape blocks, and raw image blocks using algorithms which can include a clustering algorithm 30a and/or a rules-based algorithm 30b, for example. In this example, the document parser 30 has extracted raw text blocks, raw shape blocks (lines), and a raw image which will be processed further by the page layout extractor 34, the content structure extractor 38, and augmentor 42. Raw text blocks can be identified based on style and geometry properties, which can include font family, font size, and font color. Raw shape blocks can be identified based on style and geometry properties that include vector properties, which in turn can include lines, rectangles, arcs, paths, fills, strokes, colors, and positions. Raw image blocks can be identified based on style and geometry properties, which can include positions, dimensions, encodings, and color spaces.

Figure 2B:
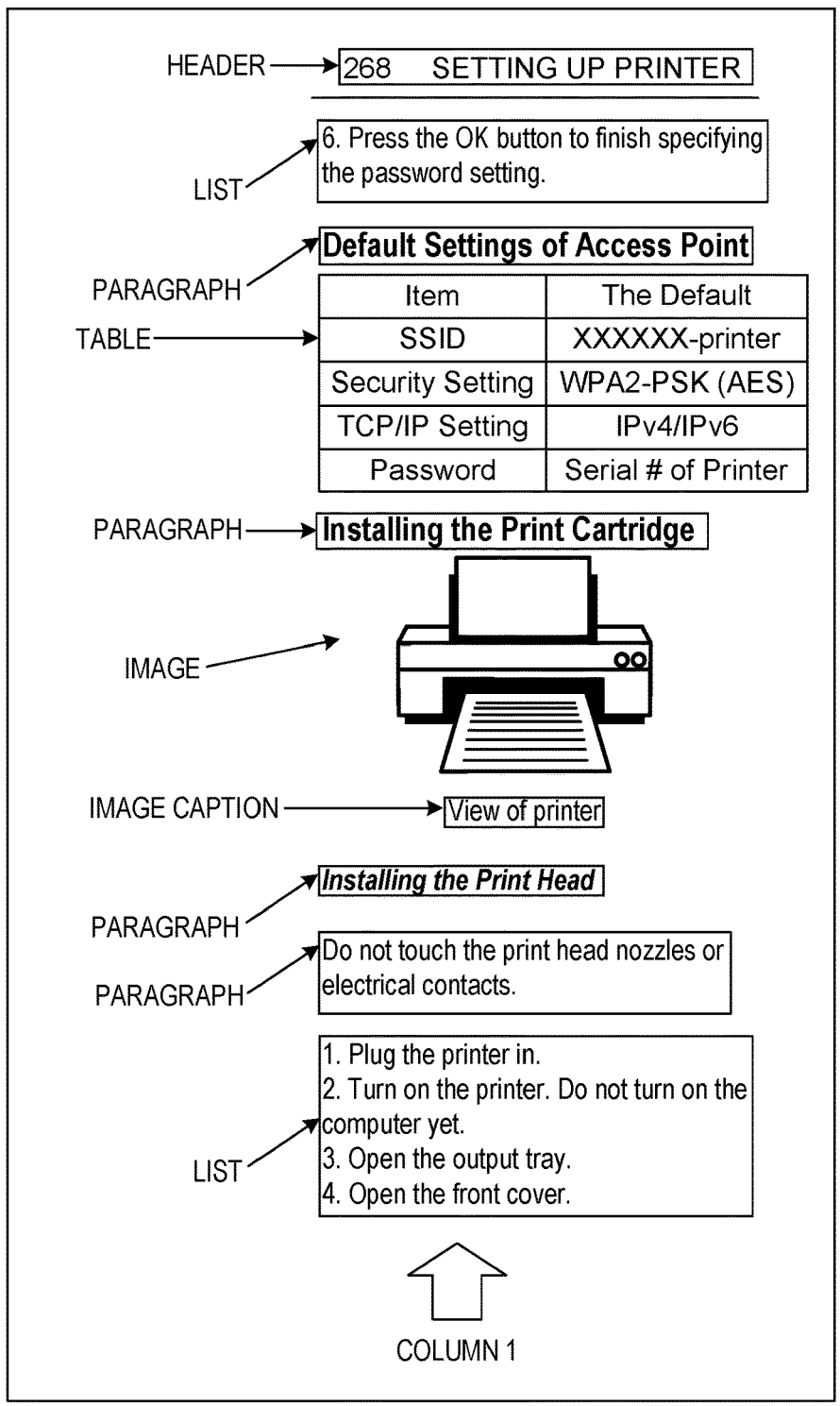
FIG. 2B is an illustration of an exemplary page layout extraction output of the page layout extractor of the dialog tree generation system of FIGS. 1A and 1B.

Referring to FIG. 2B, an example of a document layout model 36 outputted by the page layout extractor 34 is depicted. In this example, the raw blocks 32 outputted by the document parser 30 are inputted into the page layout extractor 34, which processes the raw blocks 32 to extract page layout elements and output a document layout model 36, which can include paragraphs, lists, columns, watermarks, charts, tables, images, captions, table-of-contents, and indices. In this example, the page layout extractor 34 has extracted a table, two lists, four paragraphs, a header, a column, and an image caption, which will be further processed by the content structure extractor 38. The algorithms used to process the raw blocks 32 can include a clustering algorithm 34a, a rules-based algorithm 34b, and/or recursive x-y cut 34c, for example.

Figure 2C:
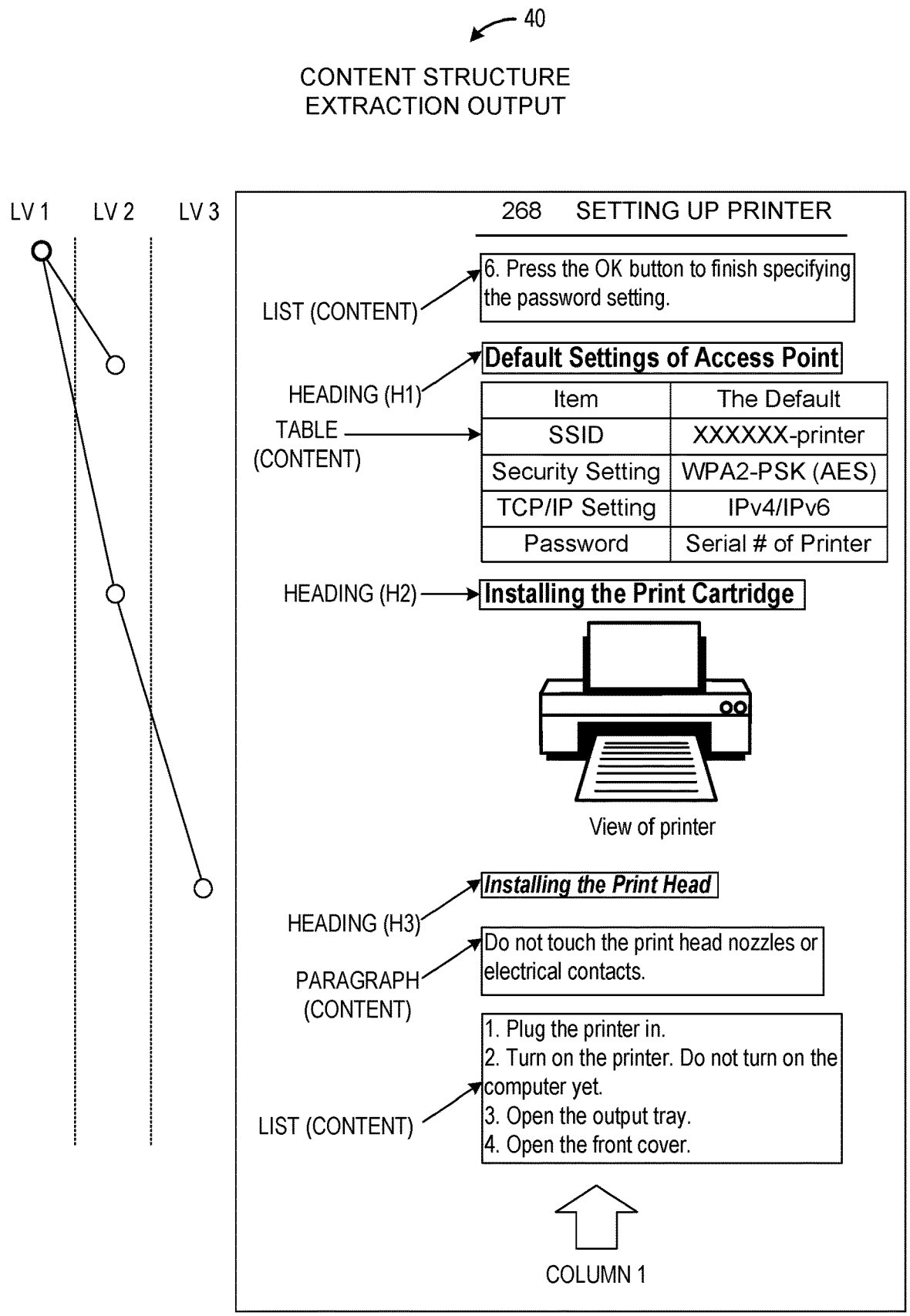
FIG. 2C is an illustration of an exemplary content structure extraction output of the content structure extractor of the dialog tree generation system of FIGS. 1A and 1B.

Referring to FIG. 2C, an example of a document structure model 40 outputted by the content structure extractor 38 is depicted. The document structure model 40 is a hierarchical graph data structure in which nodes are organized in a traversable tree, each node representing a dialog. Each heading may include one or more subheadings, and each subheading in turn may include one or more sub-subheadings. Such headings, subheadings, and sub-subheadings generally correspond to main topics, subtopics, and sub-subtopics, respectively, where the sub-subtopic is a topic within a subtopic, and a subtopic is a topic within a main topic.

In this example, the document layout model 36 outputted by the page layout extractor 34 is inputted into the content structure extractor 38, which processes the document layout model 36 to determine and output a document structure model 40, which can include titles, headers, footers, headings, heading trees, and content blocks. The content structure extractor 38 has determined a document structure model 40 including three levels, three headings, and four content blocks. The algorithms used to process the document structure model 40 can include a clustering algorithm 38a, a conditional random field 38b, a TF-IDF 38c, an ensemble classifier 38d, and/or a rules-based algorithm 38e, for example.

Figure 2D:
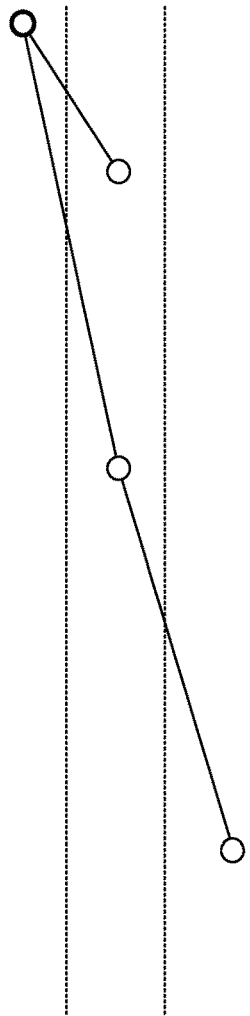
FIG. 2D is an illustration of an exemplary augmentation output of the augmentor of the dialog tree generation system of FIGS. 1A and 1B.

Referring to FIG. 2D, an example of a document structure model 40 annotated with entities 44 and synonyms 46 and outputted by the augmentor 42 is depicted. Entities 44 can be one of 3 classes: named entities, generic entities (key phrases), and action entities. In this example, the document structure model 40 outputted by the content structure extractor 38 is inputted into the augmentor 42, which annotates the document structure model 40 with entities 44 and synonyms 46. The augmentor 42 has identified five action entities defining actions ("press", "plug", "turn on", "open", and "open"), three generic entities defining key phrases ("access point", "print cartridge", "print head"), and three sets of synonyms (WAP and AP for "access point", ink cartridge for "print cartridge", printing head, inkjet head, printer head for "print head"). The algorithms used to annotate the document structure model 40 can include a conditional random field 42a and/or a rules-based algorithm 42b, for example. For example, the rules-based algorithm 42b can identify verbs in the imperative tense as an action verb that can be classified as an action entity (press, plug, turn on, open).

Figure 2E:
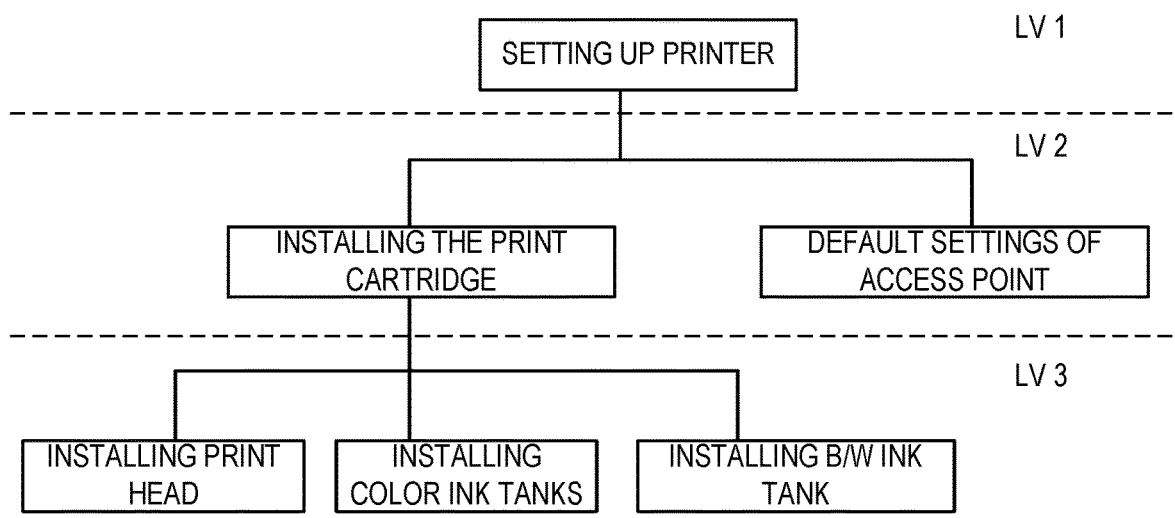
FIG. 2E is an illustration of an exemplary dialog decision tree outputted by the dialog extractor of the dialog tree generation system of FIGS. 1A and 1B.

Referring to FIG. 2E, an example of dialog decision tree 50 outputted by the dialog extractor 48 is depicted. The dialog extractor 48 infers a dialog decision tree 50 based on the annotated document structure model 40 with entities 44 and synonyms 46. In this example, the decision tree 50 includes a hierarchy with three levels, where the "setting up printer" element in the first level branches into the "installing the print cartridge" and the "default settings of access point" elements in the second level, and the "installing the print cartridge" element branches into the "installing print head", "installing color ink tanks", and "installing b/w ink tank" elements in the third level.

Figure 3:
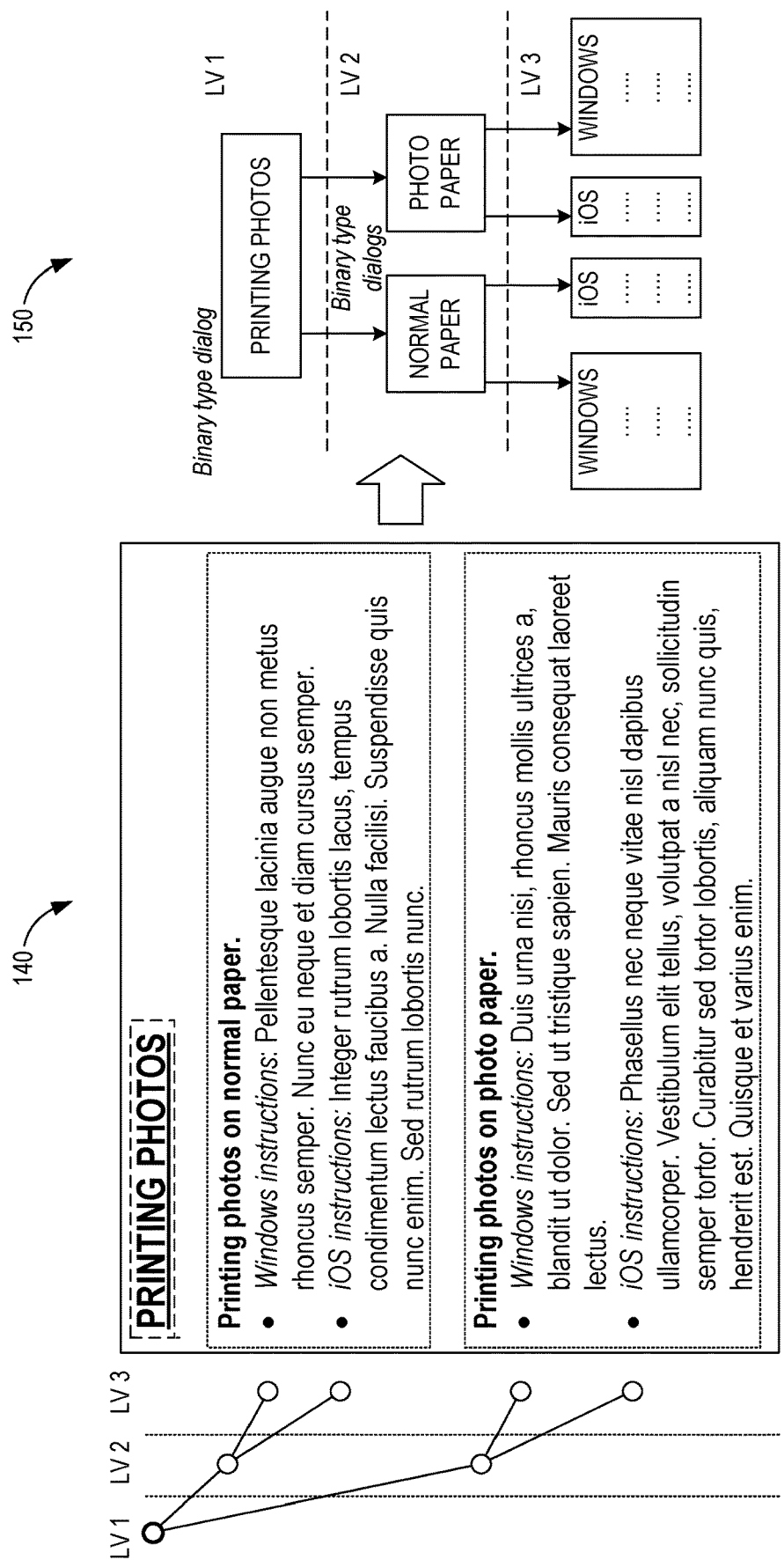
FIG. 3 is an illustration of an exemplary second document structure model and an exemplary second dialog decision tree outputted by the dialog extractor of the dialog tree generation system of FIGS. 1A and 1B.
Figure 4:
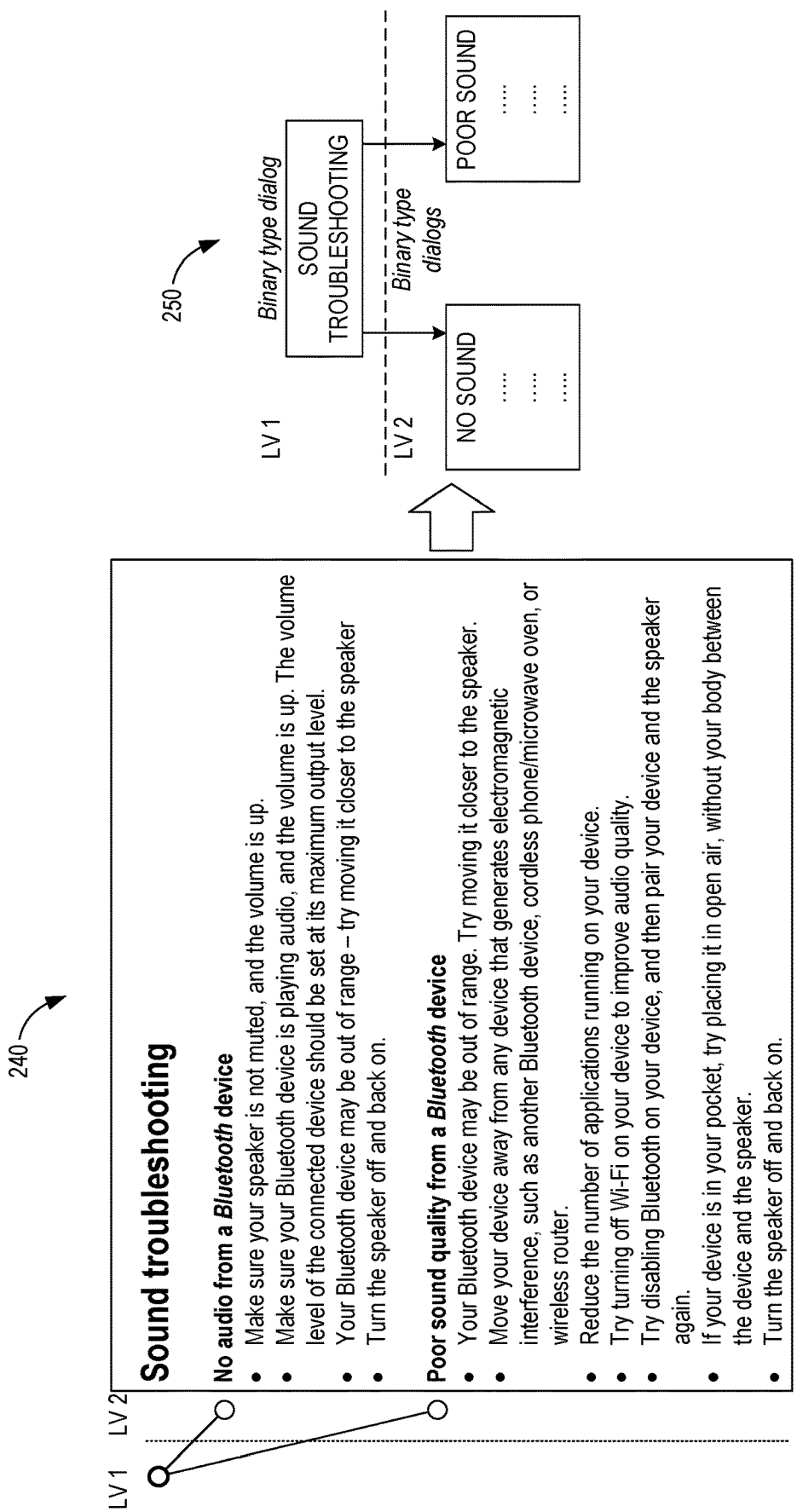
FIG. 4 is an illustration of an exemplary third document structure model and an exemplary third dialog decision tree outputted by the dialog extractor of the dialog tree generation system of FIGS. 1A and 1B.
Figure 5:
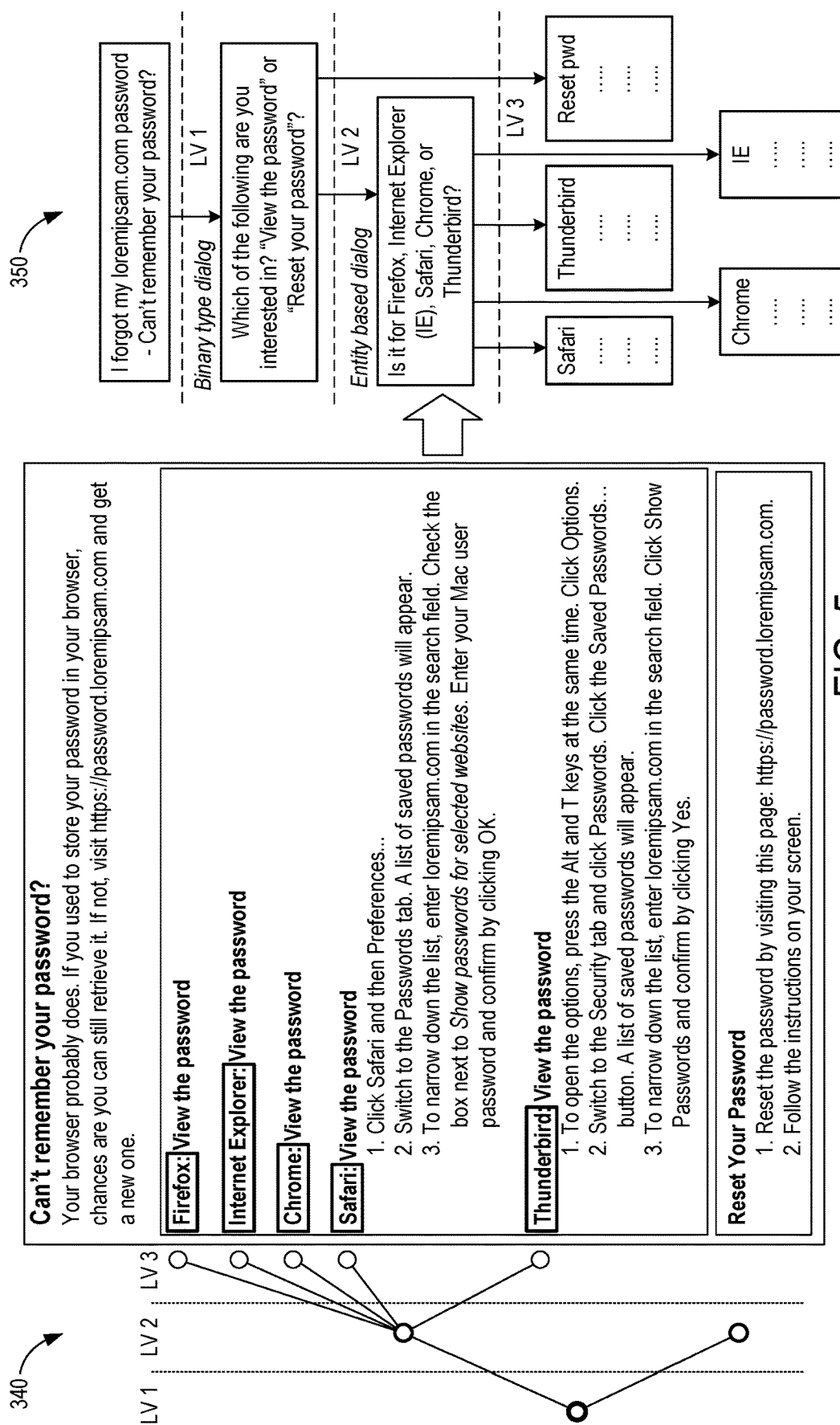
FIG. 5 is an illustration of an exemplary fourth document structure model and an exemplary fourth dialog decision tree outputted by the dialog extractor of the dialog tree generation system of FIGS. 1A and 1B.

Dialogs can come in three types: entity based, binary type, or a mixture of entity based and binary type. FIGS. 3-5 show examples of these dialogs corresponding to various exemplary document structures.

Referring to FIG. 3, an example of a second document structure model 140 and a second dialog decision tree 150 with three levels is depicted. A printer manual is the input document which is processed by the document parser to generate raw blocks, which are processed by the page layout extractor to generate a document layout model, which is processed by the content structure extractor to generate a document structure model, which is annotated with entities and synonyms by the augmentor. In this document structure model 140, there is one heading ("Printing photos"), two subheadings ("Printing photos on normal paper", "Printing photos on photo paper") branching from the heading, and four sub-subheadings (two "Windows instructions", two "iOS instructions") branching from the subheadings. A decision tree 150 is inferred based on the structure of this document structure model 140, so that the heading and each of the sub-headings and sub-subheadings are translated into nodes in the decision tree 150, each node representing a dialog. In this example, the main topic inferred from the heading is "printing photos". The subtopics inferred from the subheadings are "normal paper" and "photo paper", as the augmentor identifies "printing" as the common intent between the two subheadings and "normal paper" and "photo paper" as different entities. For each subheading, the inferred sub-subtopics are "Windows" and "iOS", as the augmentor identifies the paper type as the common intent between the sub-subheadings for each subheading and "Windows" and "iOS" as different entities. For levels 1 and 2, the dialogs are binary type, as there are two topics that branch from each node in levels 1 and 2.

Referring to FIG. 4, an example of a third document structure model 240 and a third dialog decision tree 250 with two levels is depicted. A sound device manual is the input document which is processed by the document parser to generate raw blocks, which are processed by the page layout extractor to generate a document layout model, which is processed by the content structure extractor to generate a document structure model, which is annotated with entities and synonyms by the augmentor. In this document structure model 240, there is one heading ("Sound troubleshooting") and two subheadings ("no sound", "poor sound"). In this example, the main topic inferred from the heading is "sound troubleshooting". The subtopics inferred from the subheadings are "no sound" and "poor sound", as the augmentor identifies "sound troubleshooting" as the common intent between the two subheadings. For levels 1 and 2, the dialogs are binary type, as there are two topics that branch from each node in levels 1 and 2.

Referring to FIG. 5, an example of a fourth document structure model 340 and a fourth dialog decision tree 350 with three levels is depicted. Webpages from a password-protected website are the input documents which are processed by the document parser to generate raw blocks, which are processed by the page layout extractor to generate a document layout model, which is processed by the content structure extractor to generate a document structure model, which is annotated with entities and synonyms by the augmentor. In this document structure model 340, there is one heading ("can't remember your password"), two sub-headings ("view password", "reset password"), and four sub-subheadings ("Safari", "Chrome", "Thunderbird", "Internet Explorer"). In this example, the main topic inferred from the heading is "can't remember your password". The subtopics inferred from the subheadings are "view password" and "reset password", as the augmentor identifies "can't remember password" as the common intent between the two subheadings. The sub-subtopics inferred from the subheading "view password" are "Safari", "Chrome", "Thunderbird", and "Internet Explorer", as the augmentor identifies "view password" as the common intent among the four different sub-subheadings. The dialog in level 1 is considered binary type, as there are two topics that branch from the node in level 1. There are two factors impacting the given situation: the first factor is related with the action the user is willing to take, and this factor can be either "view the forgotten password" or "resetting the password". The dialog in level 2 is considered entity based, as there are more than two topics that branch from the node in level 2—the steps that the user takes depending on the browser type, for which there are five possible values in this example: "Safari", "Chrome", "Thunderbird", and "Internet Explorer".

Figure 6:
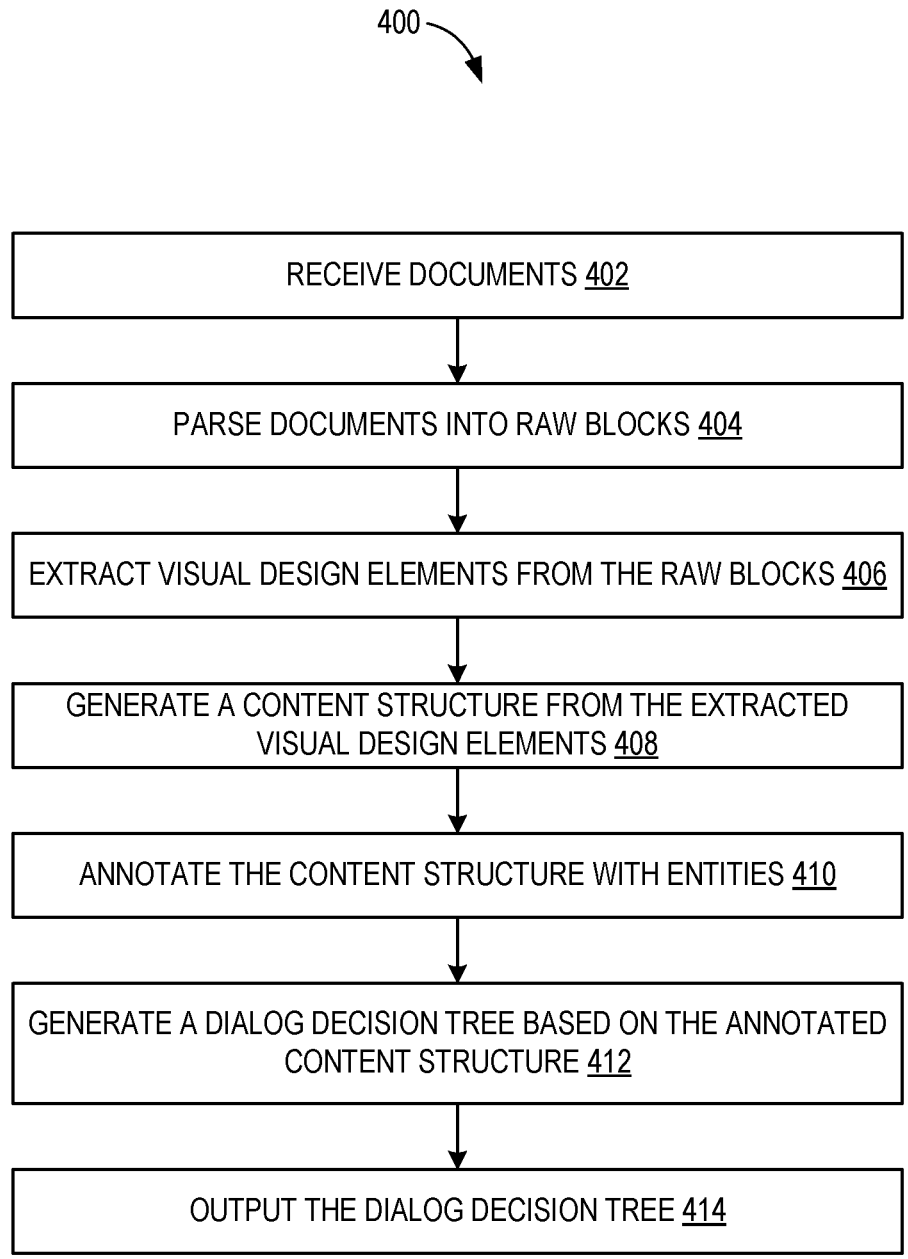
FIG. 6 is a flowchart illustrating a method for generating a dialog decision tree according to a first example embodiment of the subject disclosure.

Referring to FIG. 6, a flowchart is illustrated of a first method 400 for extracting dialog information from documents. The following description of method 400 is provided with reference to the software and hardware components described above, and can be implemented on such hardware and software. It will be appreciated that method 400 also can be performed using other suitable hardware and software components.

At step 402, input documents are received. At step 404, the input documents are parsed into raw blocks. At step 406, visual design elements are extracted from the raw blocks. At step 408, a content structure is generated from the extracted visual design elements. At step 410, the content structure is annotated with entities. At step 412, a dialog decision tree is generated based on the annotated content structure. At step 414, the dialog decision tree is outputted.

Figure 7:
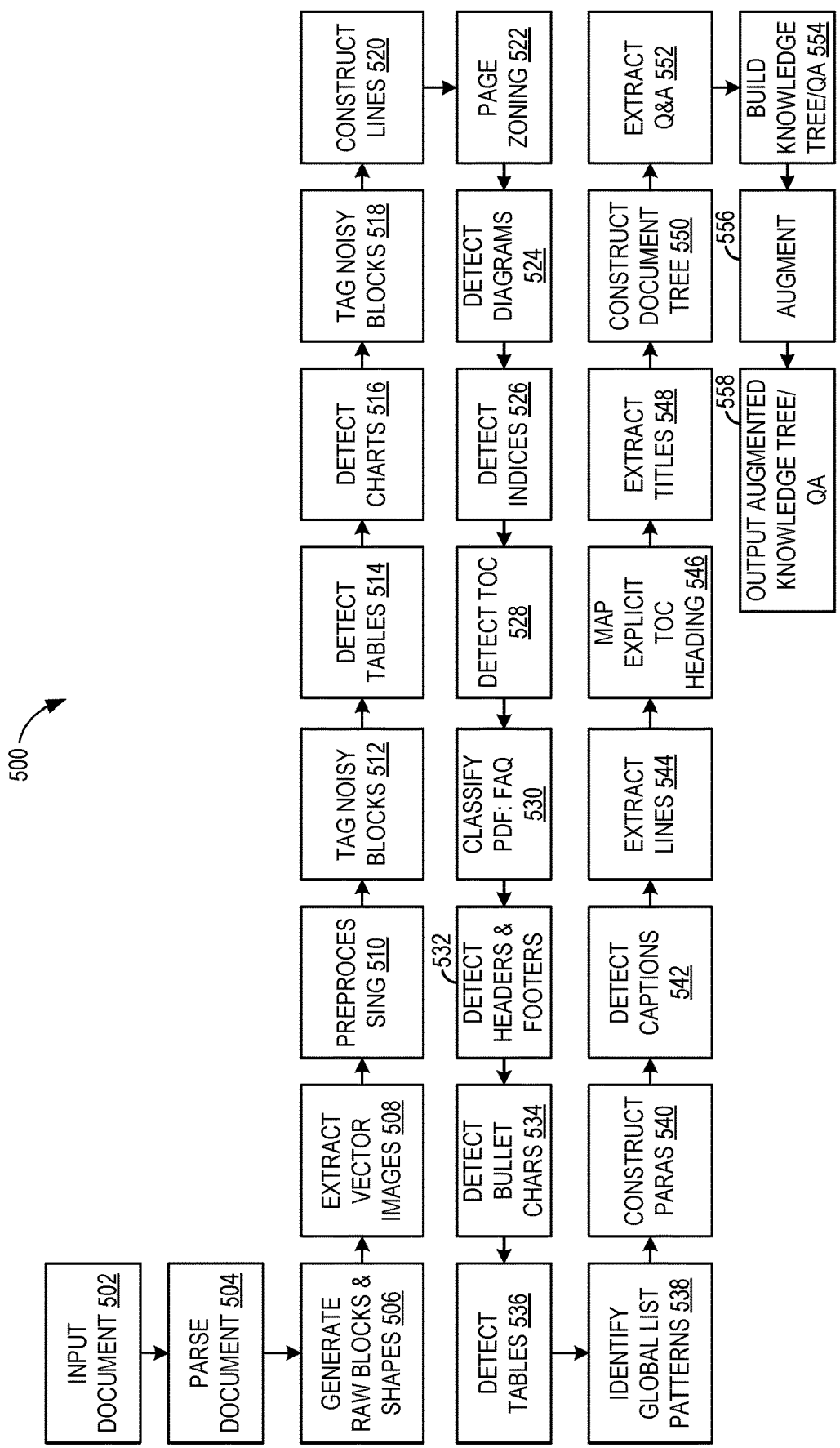
FIG. 7 is a flowchart illustrating another method for generating a dialog decision tree according to a second example embodiment of the subject disclosure.

Referring to FIG. 7, a flowchart is illustrated of a second method 500 for extracting dialog information from documents. The following description of method 500 is provided with reference to the software and hardware components described above, and can be implemented on such hardware and software. It will be appreciated that method 500 also can be performed using other suitable hardware and software components.

At step 502, a document is inputted into the processor. At step 504, the input document is parsed. At step 506, raw blocks and shapes are generated. At step 508, vector images are extracted. At step 510, preprocessing is performed. At step 512, noisy blocks are tagged. At step 514, tables are detected. At step 516, charts are detected. At step 518, noisy blocks are tagged. At step 520, lines are constructed. At step 522, page zoning is performed. At step 524, diagrams are detected. At step 526, indices are detected. At step 528, table-of-contents are detected. At step 530, the document is classified as a FAQ (frequency-asked questions). At step 532, headers and footers are detected. At step 534, bullet characters are detected. At step 536, tables are detected. At step 538, global list patterns are identified. At step 540, paragraphs are constructed. At step 542, captions are detected. At step 544, lines are extracted. At step 546, explicit table-of-contents headings are mapped. At step 548, titles are extracted. At step 550, a document tree is constructed. At step 552, questions and answers are extracted. At step 554, a knowledge tree is built. At step 556, the knowledge tree is augmented with entities and synonyms. At step 558, the augmented knowledge tree is outputted.

Figure 8:
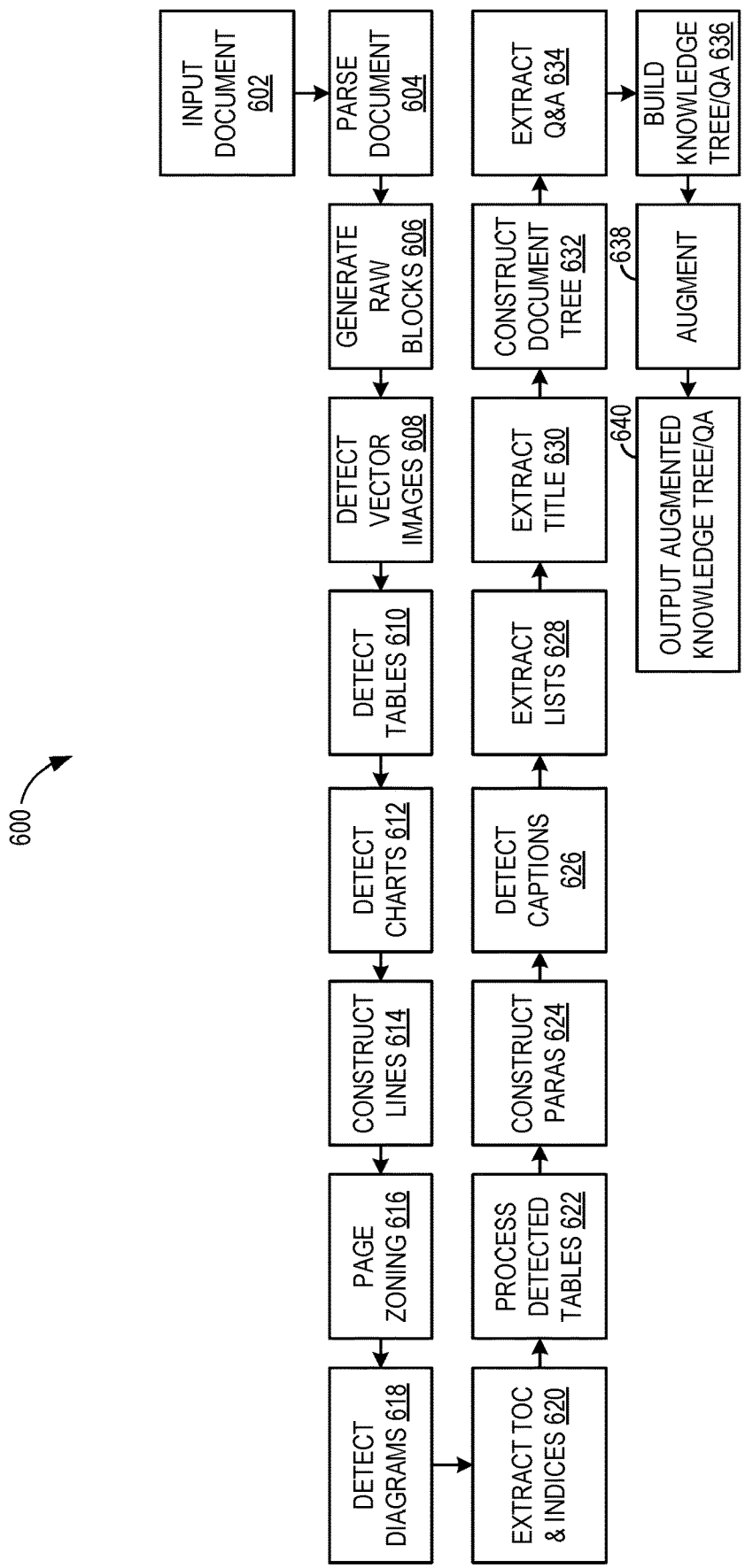
FIG. 8 is a flowchart illustrating yet another method for generating a dialog decision tree according to a third example embodiment of the subject disclosure.

Referring to FIG. 8, a flowchart is illustrated of a third method 600 for extracting dialog information from documents. The following description of method 600 is provided with reference to the software and hardware components described above, and can be implemented on such hardware and software. It will be appreciated that method 600 also can be performed using other suitable hardware and software components.

At step 602, a document is inputted into the processor. At step 604, the input document is parsed. At step 606, raw blocks are generated. At step 608, vector images are detected. At step 610, tables are detected. At step 612, charts are detected. At step 614, lines are constructed. At step 616, page zoning is performed. At step 618, diagrams are detected. At step 620, table-of-contents and indices are detected. At step 622, tables are detected. At step 624, paragraphs are constructed. At step 626, captions are detected. At step 628, lists are extracted. At step 630, titles are extracted. At step 632, a document tree is constructed. At step 634, questions and answers are extracted. At step 636, a knowledge tree is built. At step 638, the knowledge tree is augmented with entities and synonyms. At step 640, the augmented knowledge tree is outputted.

The above-described systems and methods can be used to implement a dialog extractor that can extract dialog information to output a highly precise dialog decision tree which requires minimal editing by a human operator. Accordingly, the process for generating dialog decision trees for interactive question answering systems can become automated to increase coverage and efficiency compared to tedious and time consuming conventional methods. Coverage and efficiency can be increased since the above-described systems and methods can cover more documents in less time and at less expense than using use human generated dialogs.

Figure 9:
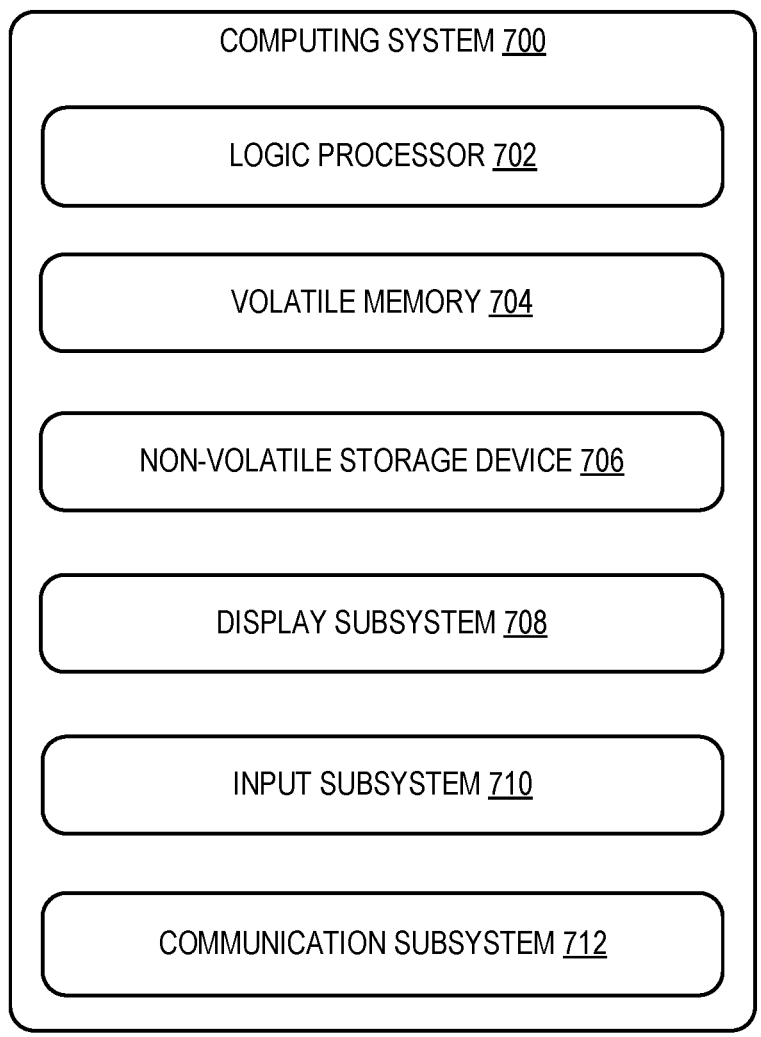
FIG. 9 is a schematic diagram illustrating an exemplary computing system that can be used to implement the dialog tree generation system of FIGS. 1A and 1B.

FIG. 9 schematically shows a non-limiting embodiment of a computing system 700 that can enact one or more of the processes described above. Computing system 700 is shown in simplified form. Computing system 700 can embody the computing device 12 or client computing device 52 described above. Computing system 700 can take the form of one or more personal computers, server computers, tablet computers, home-entertainment computers, network computing devices, gaming devices, mobile computing devices, mobile communication devices (e.g., smart phone), and/or other computing devices, and wearable computing devices such as smart wristwatches and head mounted augmented reality devices.

Computing system 700 includes a logic processor 702 volatile memory 704, and a non-volatile storage device 706. Computing system 700 can optionally include a display subsystem 708, input subsystem 710, communication subsystem 712, and/or other components not shown in earlier Figures.

Logic processor 702 includes one or more physical devices configured to execute instructions. For example, the logic processor can be configured to execute instructions that are part of one or more applications, programs, routines, libraries, objects, components, data structures, or other logical constructs. Such instructions can be implemented to perform a task, implement a data type, transform the state of one or more components, achieve a technical effect, or otherwise arrive at a desired result.

The logic processor can include one or more physical processors (hardware) configured to execute software instructions. Additionally or alternatively, the logic processor can include one or more hardware logic circuits or firmware devices configured to execute hardware-implemented logic or firmware instructions. Processors of the logic processor 702 can be single-core or multi-core, and the instructions executed thereon can be configured for sequential, parallel, and/or distributed processing. Individual components of the logic processor optionally can be distributed among two or more separate devices, which can be remotely located and/or configured for coordinated processing. Aspects of the logic processor can be virtualized and executed by remotely accessible, networked computing devices configured in a cloud-computing configuration. In such a case, these virtualized aspects are run on different physical logic processors of various different machines, it will be understood.

Non-volatile storage device 706 includes one or more physical devices configured to hold instructions executable by the logic processors to implement the methods and processes described herein. When such methods and processes are implemented, the state of non-volatile storage device 706 can be transformed—e.g., to hold different data.

Non-volatile storage device 706 can include physical devices that are removable and/or built in. Non-volatile storage device 706 can include optical memory (e.g., CD, DVD, HD-DVD, Blu-Ray Disc, etc.), semiconductor memory (e.g., ROM, EPROM, EEPROM, FLASH memory, etc.), and/or magnetic memory (e.g., hard-disk drive, floppy-disk drive, tape drive, MRAM, etc.), or other mass storage device technology. Non-volatile storage device 706 can include nonvolatile, dynamic, static, read/write, read-only, sequential-access, location-addressable, file-addressable, and/or content-addressable devices. It will be appreciated that non-volatile storage device 706 is configured to hold instructions even when power is cut to the non-volatile storage device 706.

Volatile memory 704 can include physical devices that include random access memory. Volatile memory 704 is typically utilized by logic processor 702 to temporarily store information during processing of software instructions. It will be appreciated that volatile memory 704 typically does not continue to store instructions when power is cut to the volatile memory 704.

Aspects of logic processor 702, volatile memory 704, and non-volatile storage device 706 can be integrated together into one or more hardware-logic components. Such hardware-logic components can include field-programmable gate arrays (FPGAs), program- and application-specific integrated circuits (PASIC/ASICs), program- and application-specific standard products (PSSP/ASSPs), SOC, and complex programmable logic devices (CPLDs), for example.

The terms "module," "program," and "engine" can be used to describe an aspect of computing system 700 typically implemented in software by a processor to perform a particular function using portions of volatile memory, which function involves transformative processing that specially configures the processor to perform the function. Thus, a module, program, or engine can be instantiated via logic processor 702 executing instructions held by non-volatile storage device 706, using portions of volatile memory 704. It will be understood that different modules, programs, and/or engines can be instantiated from the same application, service, code block, object, library, routine, API, function, etc. Likewise, the same module, program, and/or engine can be instantiated by different applications, services, code blocks, objects, routines, APIs, functions, etc. The terms "module," "program," and "engine" can encompass individual or groups of executable files, data files, libraries, drivers, scripts, database records, etc.

When included display subsystem 708 can be used to present a visual representation of data held by non-volatile storage device 706. The visual representation can take the form of a graphical user interface (GUI). As the herein described methods and processes change the data held by the non-volatile storage device, and thus transform the state of the non-volatile storage device, the state of display subsystem 708 can likewise be transformed to visually represent changes in the underlying data. Display subsystem 708 can include one or more display devices utilizing virtually any type of technology. Such display devices can be combined with logic processor 702, volatile memory 704, and/or non-volatile storage device 706 in a shared enclosure, or such display devices can be peripheral display devices.

When included, input subsystem 710 can comprise or interface with one or more user-input devices such as a keyboard, mouse, touch screen, or game controller. In some embodiments, the input subsystem can comprise or interface with selected natural user input (NUI) componentry. Such componentry can be integrated or peripheral, and the transduction and/or processing of input actions can be handled on- or off-board. Example NUI componentry can include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity; and/or any other suitable sensor.

When included, communication subsystem 712 can be configured to communicatively couple various computing devices described herein with each other, and with other devices. Communication subsystem 712 can include wired and/or wireless communication devices compatible with one or more different communication protocols. As non-limiting examples, the communication subsystem can be configured for communication via a wireless telephone network, or a wired or wireless local- or wide-area network, such as a HDMI over Wi-Fi connection. In some embodiments, the communication subsystem can allow computing system 700 to send and/or receive messages to and/or from other devices via a network such as the Internet.

It will be appreciated that "and/or" as used herein refers to the logical disjunction operation, and thus A and/or B has the following truth table.

| A | B | A and/or B |
|---|---|------------|
| T | T | T |
| T | F | T |
| F | T | T |
| F | F | F |

Further, it will be appreciated that the terms "includes," "including," "has," "contains," variants thereof, and other similar words used in either the detailed description or the claims are intended to be inclusive in a manner similar to the term "comprising" as an open transition word without precluding any additional or other elements.

The following paragraphs provide additional support for the claims of the subject application. One aspect provides a dialog tree generation system comprising a processor, and a memory storing instructions that, when executed by the processor, cause the system to receive documents; parse the documents into raw blocks; extract visual design elements from the raw blocks; generate a content structure from the extracted visual design elements; generate at least a dialog decision tree based on the extracted content structure, the dialog decision tree comprising a plurality of nodes organized into a hierarchy; and output the dialog decision tree. In this aspect, additionally or alternatively, the extracted visual design elements may include style and geometry properties of the raw blocks. In this aspect, additionally or alternatively, the raw blocks may comprise raw text blocks, raw image blocks, and raw shape blocks; the style and geometry properties of the raw text blocks may include color spaces, font properties, and text dimensions; the style and geometry properties of the raw shape blocks may include vector properties; and the style and geometry properties of the raw image blocks may include positions, dimensions, encodings, and color spaces. In this aspect, additionally or alternatively, the extracted visual design elements may comprise a page layout including at least one of paragraphs, lists, columns, charts, tables, captions, table of contents, or indices. In this aspect, additionally or alternatively, the tables may be determined by clustering lines of the raw blocks into separate bins and detecting boundaries of the bins or segmenting table columns/rows based on alignment for borderless tables. In this aspect, additionally or alternatively, the outputted dialog decision tree may be executed by a virtual assistant program to thereby present an interactive chat dialog to a user that proceeds according to the dialog decision tree. In this aspect, additionally or alternatively, the content structure may include titles, headers, footers, headings, and heading trees. In this aspect, additionally or alternatively, the content structure may be a hierarchical graph data structure in which nodes are organized in a traversable tree. In this aspect, additionally or alternatively, the content structure may be annotated with action entities defining actions and generic entities defining key phrases.

Another aspect provides a dialog tree generation method comprising receiving documents; parsing the documents into raw blocks; extracting visual design elements from the raw blocks; generating a content structure from the extracted visual design elements; generating at least a dialog decision tree based on the extracted content structure, the dialog decision tree comprising a plurality of nodes organized into a hierarchy; and outputting the dialog decision tree. In this aspect, additionally or alternatively, the extracted visual design elements may include style and geometry properties of the raw blocks. In this aspect, additionally or alternatively, the raw blocks may comprise raw text blocks, raw image blocks, and raw shape blocks; the extracted visual design elements may include style and geometry properties of the raw blocks; the style and geometry properties of the raw text blocks may include color spaces, font properties, and text dimensions; the style and geometry properties of the raw shape blocks may include vector properties; and the style and geometry properties of the raw image blocks may include positions, dimensions, encodings, and color spaces. In this aspect, additionally or alternatively, the extracted visual design elements may include a page layout. In this aspect, additionally or alternatively, the page layout may include at least one of paragraphs, lists, columns, charts, tables, captions, table of contents, or indices. In this aspect, additionally or alternatively, the tables may be determined by clustering lines of the raw blocks into separate bins and detecting boundaries of the bins or segmenting table columns/rows based on alignment for borderless tables. In this aspect, additionally or alternatively, the content structure may include titles, headers, footers, headings, and heading trees. In this aspect, additionally or alternatively, the content structure may be a hierarchical graph data structure in which nodes are organized in a traversable tree. In this aspect, additionally or alternatively, the content structure may be annotated with action entities defining actions and generic entities defining key phrases.

Another aspect provides a computing system comprising a processor, and a memory storing instructions that, when executed by the processor, cause the system to implement a virtual assistant configured to execute a dialog decision tree to thereby present an interactive chat dialog to a user that proceeds according to the dialog decision tree, the dialog decision tree being generated by a dialog tree generation software system, configured to receive documents; parse the documents into raw text blocks, raw image blocks, and raw shape blocks; process the raw text blocks, raw image blocks, and raw shape blocks to generate a document layout model; process the document layout model to generate a document structure model; annotate the document structure with entities and synonyms; generate at least the dialog decision tree based on the annotated document structure, the dialog decision tree comprising a plurality of nodes organized into a hierarchy; and output the dialog decision tree to a location accessible by the virtual assistant. In this aspect, additionally or alternatively, visual design elements of the document layout model may be analyzed to generate the document structure model comprising a hierarchical graph data structure in which nodes are organized in a traversable tree, each node representing a dialog.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A dialog tree generation system comprising:
a processor, and a memory storing instructions that, when executed by the processor, cause the dialog tree generation system to:
receive documents;
parse the documents into raw blocks;
extract visual design elements from the raw blocks, the extracted visual design elements including style and geometry properties of the raw blocks;
clustering the raw blocks based on the extracted visual design elements of the raw blocks;
arrange the clustered raw blocks into a hierarchy;
generate a content structure from the clustered raw blocks arranged into the hierarchy;
generate at least a dialog decision tree based on the content structure, the dialog decision tree comprising a plurality of nodes organized into the hierarchy, and levels of the content structure correspond to levels of the dialog decision tree, wherein the dialog decision tree includes a binary type node branch from a node to two topics and an entity based node branching from a node to more than two topics;
output the dialog decision tree;
execute a virtual assistant to execute the dialog decision tree;
receive a user input;
process the user input with the dialog decision tree; and
generate an output based on the executed dialog decision tree, wherein
the style and geometry properties include at least one of font and typographical properties, paragraph alignment, line lengths, column widths, or graphic shapes,
the outputted dialog decision tree is executed by the virtual assistant to thereby present an interactive chat dialog to a user that proceeds according to the dialog decision tree and includes a binary type dialog based on the binary type node branch and an entity based dialog based on the entity based node branching.

2. The dialog tree generation system of claim 1, wherein the raw blocks comprise raw text blocks, raw image blocks, and raw shape blocks;
the style and geometry properties of the raw text blocks include color spaces and text dimensions.

3. The dialog tree generation system of claim 2, wherein the style and geometry properties of the raw shape blocks include vector properties; and
the style and geometry properties of the raw image blocks include positions, dimensions, encodings, and color spaces.

4. The dialog tree generation system of claim 1, wherein the extracted visual design elements comprise a page layout including at least one of paragraphs, lists, columns, charts, tables, captions, table of contents, or indices.

5. The dialog tree generation system of claim 4, wherein the tables are determined by clustering lines of the raw blocks into separate bins and detecting boundaries of the bins or segmenting table columns/rows based on alignment for borderless tables.

6. The dialog tree generation system of claim 1, wherein the content structure includes titles, headers, footers, headings, and heading trees.

7. The dialog tree generation system of claim 1, wherein the content structure is a hierarchical graph data structure in which nodes are organized in a traversable tree.

8. The dialog tree generation system of claim 1, wherein the content structure is annotated with action entities defining actions and generic entities defining key phrases.

9. The dialog tree generation system of claim 1, wherein the font and typographical properties include at least one of typeface, letterforms, font size, font family, style, color, orientation, length, contrast, position, spacing, or dimension.

10. A dialog tree generation method comprising:
receiving documents;
parsing the documents into raw blocks;
extracting visual design elements from the raw blocks, the extracted visual design elements including style and geometry properties of the raw blocks;
clustering the raw blocks based on the extracted visual design elements of the raw blocks;
arranging the clustered raw blocks into a hierarchy;
generating a content structure from the clustered raw blocks arranged into the hierarchy;
generating at least a dialog decision tree based on the content structure, the dialog decision tree comprising a plurality of nodes organized into the hierarchy, and levels of the content structure correspond to levels of the dialog decision tree, wherein the dialog decision tree includes a binary type node branch from a node to two topics and an entity based node branching from a node to more than two topics;
outputting the dialog decision tree;
executing a virtual assistant to execute the dialog decision tree;
receiving a user input;
processing the user input with the dialog decision tree; and
generating an output based on the executed dialog decision tree, wherein
the style and geometry properties include at least one of font and typographical properties, paragraph alignment, line lengths, column widths, or graphic shapes, and
the outputted dialog decision tree is executed by the virtual assistant to thereby present an interactive chat dialog to a user that proceeds according to the dialog decision tree and includes binary type dialog based on the binary type node branch and an entity based dialog based on the entity based node branching.

11. The dialog tree generation method of claim 10, wherein
the raw blocks comprise raw text blocks, raw image blocks, and raw shape blocks;
the style and geometry properties of the raw text blocks include color spaces and text dimensions;
the style and geometry properties of the raw shape blocks include vector properties; and
the style and geometry properties of the raw image blocks include positions, dimensions, encodings, and color spaces.

12. The dialog tree generation method of claim 10, wherein the extracted visual design elements include a page layout.

13. The dialog tree generation method of claim 12, wherein the page layout includes at least one of paragraphs, lists, columns, charts, tables, captions, table of contents, or indices.

14. The dialog tree generation method of claim 13, wherein the tables are determined by clustering lines of the raw blocks into separate bins and detecting boundaries of the bins or segmenting table columns/rows based on alignment for borderless tables.

15. The dialog tree generation method of claim 10, wherein the content structure includes titles, headers, footers, headings, and heading trees.

16. The dialog tree generation method of claim 10, wherein the content structure is a hierarchical graph data structure in which nodes are organized in a traversable tree.

17. The dialog tree generation method of claim 10, wherein the content structure is annotated with action entities defining actions and generic entities defining key phrases.

18. The dialog tree generation method of claim 10, wherein the font and typographical properties include at least one of typeface, letterforms, font size, font family, style, color, orientation, length, contrast, position, spacing, or dimension.

19. A computing system comprising:
   a processor, and a memory storing instructions that, when executed by the processor, cause the computing system to implement:
      a virtual assistant configured to execute a dialog decision tree to thereby present an interactive chat dialog to a user that proceeds according to the dialog decision tree and includes binary type dialog based on a binary type node branch and an entity based dialog based on an entity based node branching, the virtual assistant further configured to receive a user input, process the user input with the dialog decision tree, and generate an output based on the executed dialog decision tree,
      wherein the dialog decision tree is generated by a dialog tree generation software system, configured to:
         receive documents;
         parse the documents into raw text blocks, raw image blocks, and raw shape blocks;
         extract visual design elements from the raw text blocks, the extracted visual design elements including style and geometry properties of the raw blocks;
         cluster the raw blocks based on the extracted visual design elements of the raw blocks;
         arrange the clustered raw blocks into a hierarchy to generate a document layout model;
         process the document layout model to generate a document structure model;
         annotate the document structure with entities and synonyms;
         generate at least the dialog decision tree based on the annotated document structure, the dialog decision tree comprising a plurality of nodes organized into the hierarchy, and levels of the document structure model correspond to levels of the dialog decision tree, wherein the dialog decision tree includes the binary type node branch from a node to two topics and the entity based node branching from a node to more than two topics; and
         output the dialog decision tree to a location accessible by the virtual assistant, wherein the style and geometry properties include at least one of font and typographical properties, paragraph alignment, line lengths, column widths, or graphic shapes.

20. The computing system of claim 19, wherein the visual design elements of the document layout model are analyzed to generate the document structure model comprising a hierarchical graph data structure in which nodes are organized in a traversable tree, each node representing a dialog.

* * * * *